Patented Nov. 17, 1942

2,302,465

UNITED STATES PATENT OFFICE 2,302,465

METHOD OF PREPARING THE OXIDATION PRODUCTS OF ALKYLATED BENZENE AND CYCLOHEXANE COMPOUNDS

Robert C. Palmer and Carlisle H. Bibb, Pensacola, Fla., assignors to Newport Industries, Inc., Pensacola, Fla., a corporation of Delaware No Drawing. Application April 24, 1940, Serial No. 331,404

4 Claims. (Cl. 260—524)

This invention relates to a method of preparing the oxidation products of alkylated benzene and cyclohexane compounds. More particularly, the invention relates to the preparation of the oxidation products of crude cymene, or a mixture of a cymene and a menthane.

When crude cymene, containing a mixture of about 66% of cymene and 34% of para menthane, is subjected to oxidation, as by means of molecular oxygen and an oxidation catalyst, the oxidation may not be carried to completion in a single step, so that after oxidizing in one step to the extent of about 40%, the unattacked crude cymene is recovered for subsequent oxidation. In attempting to obtain the oxidation products in a state of reasonable purity, we have discovered that a certain small portion of the oxidation products consists of oxygen containing compounds, presumably peroxides, which thermally decompose very easily to liberate considerable heat and to produce gases that are very difficult to condense. If it were not for the great dilution of such oxygen containing compounds in the mixture, they would undoubtedly decompose with explosive violence when heated under conditions suitable for distillation.

The method of the present invention is directed to the elimination of these peroxide-like compounds in such a manner as to avoid the likelihood of any violent reaction taking place. We have found that this can be accomplished by heating the crude oxidation mass, before distillation, under controlled conditions to a temperature at which the reaction proceeds at a fast rate, but below that at which these oxygen containing compounds decompose with violence. The controlled conditions include means for the removal of such excessive quantities of heat as may be liberated. Alternatively, the crude reaction mass may be distilled under high vacuum at a sufficiently low temperature to prevent violent decomposition of the oxygen containing compounds, or peroxides, during the removal by distillation of most of the hydrocarbons present in the reaction mass. After the removal of the major portion of the hydrocarbons, the temperature of the reaction mass remaining in the still is advanced to a point at which decomposition is noticeable, while controlling the temperature by some system of heat extraction, such as cooling coils, or by allowing the charge to distill itself up into a fractionating column, heat being removed therefrom by dephlegmation.

The phenomenon of the formation of oxygen containing compounds, such as peroxides, which thermally decompose with an exothermic reaction, occurs not only in the catalytic oxidation of cymenes and menthanes, but also in similar processes for the oxidation of any alkylated benzene or alkylated cyclohexane compounds wherein a substituent alkyl group contains two or more carbon atoms. When such catalytic oxidation processes are carried out on a laboratory scale, no difficulty may be experienced from the presence of these thermally decomposable reaction products in the oxidation mass, owing to the relatively large radiation losses characteristic of laboratory scale operations, but when the same catalytic oxidation processes are carried out on a plant scale, the phenomenon manifests itself most alarmingly by sudden, and otherwise unexplainable, increases in temperature during the fractional distillation of the oxidation reaction mass. If not guarded against and properly controlled, the sudden rises in temperature might easily lead to violent explosions.

It is therefore an important object of this invention to provide a method of preparing the catalytic oxidation products of alkylated benzene and cyclohexane compounds, containing at least two carbon atoms in the side chain, wherein oxidation products, such as peroxides, which thermally decompose with an exothermic reaction, are decomposed, or otherwise eliminated, under controlled temperature conditions such that the likelihood of violent reaction during large scale operation is greatly minimized.

It is a further important object of this invention to provide a method of safely decomposing, without giving rise to violent reaction, the oxygen containing, easily thermally decomposable peroxide-like products resulting from the catalytic oxidation of crude cymene, or other cyclic compound belonging to the group of alkylated benzene and cyclohexane compounds containing at least two carbon atoms in an alkyl side chain.

Other and further important objects of this invention will become apparent from the following description and appended claims.

The method of this invention is in general applicable to the preparation of the oxidation products, by a liquid phase catalytic oxidation, of any alkylated cyclic compound having six carbon atoms in the ring and an alkyl side chain containing two or more carbon atoms. These starting materials will be generically referred to herein as alkylated benzene and cyclohexane compounds and include ethyl benzene and its homologues and isopropyl cyclohexane and its homologues. The specific compounds, however, in connection with which the method of our invention will be described, are cymenes and menthanes, particularly a crude cymene mixture containing, for instance, 66% of para cymene and 34% of para menthane.

The catalytic oxidation of such starting hydrocarbons, as carried out in liquid phase by means of molecular oxygen, may not go to completion in a single continuous step, but may be carried out in a series of partial oxidation steps with intermediate separation of the desired products of oxidation from the unreacted hydrocarbons started with. Since the catalytic oxidation step per se does not form any part of the present invention, our method will be described in connection with the treatment of the oxidation reaction mass resulting from a partial oxidation step. More specifically, the invention will be described in connection with the further processing of a partial oxidation reaction mass resulting from the catalytic, liquid phase oxidation of crude cymene, containing a mixture of approximately 66% of para cymene and 34% of para menthane, oxidized to the extent of about 40%.

The formation of these peroxide-like bodies is also noticeable when oxidizing in the liquid phase a material containing a very high proportion of para menthane. The oxidation of such material is preferably carried out at temperatures in excess of 100° C., say 125° C., at which temperature it would be expected the peroxides would be destroyed. We find, however, that the reaction mass after oxidation extending over 20 hours or more at this elevated temperature contains similar peroxide-like bodies in substantial amount. It is probable that these bodies are intermediate products of some of the end oxidation products, and will be present as long as any oxygen is being supplied to the reaction mass.

The following example will serve to illustrate the method of our invention as applied to a crude cymene oxidation reaction mass for the purpose of preventing or minimizing violent reactions during the thermal decomposition of the peroxide-like compounds.

*Example 1*

A jacketed vessel of 75 gallons capacity is heated by steam to 135° C. Into this vessel is pumped a crude oxidation reaction mass resulting from the partial oxidation of 50 gallons of the above described mixture of cymene and para menthane. The introduction of the crude oxidation reaction mass into the vessel is controlled at a slow enough rate such that the product in the vessel is maintained at about 135° to 145° C. At this temperature, decomposition of the oxygen containing compounds, such as peroxides, takes place rapidly and the heat liberated thereby is sufficient to sustain the temperature of the mass within the range indicated, without further heating by means of steam in the jacket. The rate of the decomposition reaction is controlled by the rate of admitting the charge into the jacketed vessel, so that at no time are excessive quantities of heat liberating compounds present in the vessel. After all of the charge has been introduced, the mixture is allowed to stand for a short time in order to complete the decomposition reaction. The resulting mass can then be fractionally distilled to recover the desired oxidation products separately from the unattacked starting hydrocarbons. The latter are reused in subsequent oxidation steps.

In the carrying out of the process of the foregoing example, we have observed that the thermally decomposable peroxide-like compounds cannot be satisfactorily removed from the partial oxidation reaction mass by washing with an aqueous alkali solution. Prior to the decomposition, such thermally decomposable peroxide-like compounds have thus been found to be non-soluble in aqueous alkalies, contrary to what might have been expected from a study of the prior art. We have found, however, that after decomposition, these peroxide-like compounds have been replaced by much more definitely acidic compounds. The acidic material remaining after the thermal decomposition of the peroxides is preferably washed out of the crude reaction mass before fractional distillation by means of an aqueous alkaline solution. This insures the absence of any violently exothermic reaction during the distillation step.

*Example 2*

50 gallons of a crude partial oxidation reaction mass similar to that employed in the process of Example 1 are introduced into a high vacuum jacketed still. The charge in the still is heated by steam in the jacket to about 100° C., while drawing a vacuum of about 5 mm. of mercury, absolute pressure, on the still. These conditions of temperature and vacuum are maintained until practically all of the hydrocarbons have been distilled off. The temperature in the still is then advanced to around 125 to 145° C. and maintained at that temperature by circulation of cold water, if necessary, through the jacket of the still. Decomposition of the thermally decomposable oxygen containing compounds takes place rapidly at the temperature indicated, but by providing ample vacuum capacity and by circulating cooling water through the jacket of the still, the rate of evolution of non-condensible gases can be satisfactorily controlled so as to prevent substantial loss of vacuum and consequent rise in the boiling temperature of the charge in the still. Distillation is continued until the separation of the desired products of oxidation has been effected.

In the process of the latter example, it is important to prevent the temperature from getting out of control, since as the temperature rises, the volume of non-condensible gases given off by the decomposition of the thermally decomposable peroxide-like compounds increases rapidly, and may increase to such an extent as to reduce the degree of vacuum very materially. Should that happen, the temperature at which the liquid charge boils would also increase, with the result that there might be such a large volume of heat generated from the exothermic reaction taking place within the charge as to make it impossible to conduct the heat away sufficiently rapidly to prevent a serious explosion. It is therefore important to maintain carefully controlled conditions as to degree of vacuum and temperature and ample pump capacity to care for any sudden increase in fixed gases.

By the elimination of the thermally decomposable peroxide-like compounds under controlled conditions, the hazards of explosion are avoided. Furthermore, maintenance of vacuum in the fractionating still becomes possible and more complete separation of the unattacked hydrocarbons from the oxidizable portion of the charge undergoing distillation is realized, since there is no fixed gas streaming through the fractionating column.

The temperature specified in the examples need not be adhered to, since the reaction takes place over a much broader range. The specified temperatures are given as being satisfactory for rapidly completing the thermal decomposition. However, like most organic reactions, the thermal decomposition takes place slower at lower temperatures and faster at higher temperatures. We prefer not to use temperatures around the boiling point of the mixture because some of the tertiary alcohols present are apt to be dehydrated. We also prefer not to use substantially lower temperatures, even though the reaction proceeds, because of the longer time of treatment. Thus it is readily seen that our invention is not limited to the exact temperatures specified. Also the few examples of method only illustrate other possible procedures, such as conducting the operation on small increments of the mass of controllable size, or providing means of controlling large masses through the discharge of heat by reflux condensation. The principle of the invention lies in the performance of the step of thermally decomposing the heat liberating peroxide-like bodies prior to the recovery of the oxidation products.

There may be, and usually are, other thermally decomposable compounds present in the reaction masses resulting from the liquid phase catalytic oxidation of cymenes and menthanes, but the ones with which this invention is concerned are those that are thermally decomposable in an exothermic reaction.

It will, of course, be understood that various details of the process may be varied through a wide range without departing from the principles of this invention and it is, therefore, not the purpose to limit the patent granted hereon otherwise than necessitated by the scope of the appended claims.

We claim as our invention:

1. The method of treating a reaction mass produced by the oxidation of a compound selected from the group consisting of alkylated benzene and cyclohexane compounds having at least one alkyl radical containing two or more carbon atoms, to prevent violent decomposition of said mass on heating, said method comprising heating said mass at a temperature ranging from about 125° C. to 145° C.

2. The method of treating a reaction mass produced by the oxidation of cymene, to prevent violent decomposition of said mass on heating, said method comprising heating said mass at a temperature ranging from about 125° C. to 145° C.

3. The method of treating a reaction mass produced by the oxidation of menthane, to prevent violent decomposition of said mass on heating, said method comprising heating said mass at a temperature ranging from 125° C. to not over 145° C.

4. The method of treating a reaction mass produced by the oxidation of cymene, to prevent violent decomposition of said mass on heating, said method comprising heating a part of said reaction mass to a temperature above 100° C. but not over 145° C. at which decomposition is noticeable but not violent, and controlling the rate of addition to said part of the remainder of said mass in increments to maintain the temperature within said range.

ROBERT C. PALMER.
CARLISLE H. BIBB.